United States Patent
Apfel

(10) Patent No.: US 7,773,354 B2
(45) Date of Patent: Aug. 10, 2010

(54) VOLTAGE PROTECTION CIRCUIT FOR POWER SUPPLY DEVICE AND METHOD THEREFOR

(75) Inventor: Russell J. Apfel, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 652 days.

(21) Appl. No.: 11/645,100

(22) Filed: Dec. 22, 2006

(65) Prior Publication Data
US 2008/0151457 A1    Jun. 26, 2008

(51) Int. Cl.
*H02H 3/00*    (2006.01)
(52) U.S. Cl. ........................................................ 361/55
(58) Field of Classification Search .................... 361/55
See application file for complete search history.

(56) References Cited

U.S. PATENT DOCUMENTS

| | | | |
|---|---|---|---|
| 4,644,437 A | 2/1987 | Robe | |
| 5,325,315 A | 6/1994 | Engel et al. | |
| 5,497,072 A | 3/1996 | Lecomte et al. | |
| 5,576,557 A | 11/1996 | Ker et al. | |
| 6,268,639 B1 * | 7/2001 | Li et al. | 257/577 |
| 6,563,726 B1 | 5/2003 | Hirst | |
| 6,636,404 B1 | 10/2003 | Whitney et al. | |
| 7,106,562 B2 * | 9/2006 | Kitagawa | 361/56 |
| 2002/0075619 A1 | 6/2002 | Maytum et al. | |
| 2003/0206626 A1 | 11/2003 | Scott et al. | |
| 2003/0213996 A1 | 11/2003 | Van Lieverloo | |
| 2004/0021178 A1 | 2/2004 | Larson | |
| 2004/0042141 A1 | 3/2004 | Mikolajczak et al. | |
| 2004/0052022 A1 | 3/2004 | Laraia | |
| 2004/0109275 A1 | 6/2004 | Whitney | |
| 2004/0150929 A1 | 8/2004 | Strayer et al. | |
| 2004/0195225 A1 | 10/2004 | Thommes | |
| 2004/0257743 A1 | 12/2004 | Chen et al. | |
| 2005/0152080 A1 | 7/2005 | Harris et al. | |
| 2005/0195540 A1 | 9/2005 | Streibl et al. | |
| 2005/0212051 A1 | 9/2005 | Jozwiak et al. | |
| 2006/0149978 A1 | 7/2006 | Randall et al. | |
| 2006/0164769 A1 | 7/2006 | Stanford et al. | |
| 2006/0168459 A1 | 7/2006 | Dwelley et al. | |
| 2008/0114998 A1 * | 5/2008 | Ferentz et al. | 713/324 |

OTHER PUBLICATIONS

International Search report and Written Opinion.
Maxim—MAX5945—Quad Network Power Controller for Power-Over-LAN, 2005 Maxim Integrated Products, (44 pgs).
C8051F316—25 MIPS, 16 kB Flash, 10-Bit ADC, 24-Pin Mixed-Signal MCU, Silicon Laboratories, Sep. 14, 2005 (1 pg).

(Continued)

*Primary Examiner*—Ronald W Leja
(74) *Attorney, Agent, or Firm*—Polansky & Associates, P.L.L.C.; R. Michael Reed

(57) ABSTRACT

A device is disclosed that includes an interface and an integrated circuit. The interface is communicatively coupled to a network connection to provide power and data to a power over Ethernet (PoE) powered device via the network connection. The integrated circuit is coupled to the interface. The integrated circuit includes a power over Ethernet (PoE) controller, a detection and classification circuit, and a voltage protection circuit. The detection and classification circuit is coupled to the interface to detect and classify a power level of the PoE powered device. The voltage protection circuit is coupled to the interface to detect a power event and to provide an alert to the PoE controller in response to the detected power event.

24 Claims, 7 Drawing Sheets

OTHER PUBLICATIONS

C8051F316—25 MIPS, 16 kB Flash, 10-Bit ADC, 24-Pin Mixed-Signal MCU—Selected Electrical Specifications, Silicon Laboratories, Sep. 14, 2005 (1 pg).

PowerDsine 6500 Series—User Guide, 2005 PowerDsine Ltd., (20 pgs).

* cited by examiner

VOLTAGE PROTECTION CIRCUIT FOR POWER SUPPLY DEVICE AND METHOD THEREFOR

FIELD OF THE DISCLOSURE

The present disclosure is generally related to methods of voltage protection and voltage protection circuits for power supply devices.

BACKGROUND

Power over Ethernet (PoE), which is outlined in IEE Std 802.3™-2005 clause 33 (the PoE standard), refers to a technique for delivering power and data to an electronic device via a network cable, such as a twisted pair Ethernet cable. Typically, a PoE system includes power sourcing equipment (PSE) device to provide a power supply via Ethernet cabling to one or more electronic devices, which may be referred to as powered devices. PoE reduces the need for a separate power source to deliver power to attached powered devices, which may include Voice over Internet protocol (VoIP) telephones, wireless routers, security devices, field devices to monitor process control parameters, data processors, and other devices.

Generally, since PSE devices include interfaces for connecting to cables, PSE devices may be exposed to transient conditions, such as electrostatic discharge events, high voltage surges, or other conditions that exceed a power rating of associated circuitry. The PoE standard specifies that a PSE device should be capable of withstanding high voltage (HV) transient conditions for a period of time, such as 1000 volts having 300 μs full rise time and a 50 ns half rise time.

In general, a PSE device applies power from an external power supply (approximately plus or minus 44 volts to 57 volts) to an Ethernet cable through a switch device. The switch device may be a transistor to selectively couple the external power supply to the Ethernet line or channel. Since telephone lines typically operate at a negative voltage (such as −48 volts), the PSE device may apply a negative voltage to the Ethernet line.

In some PSE devices, the switch device may be integrated. Under normal operating conditions, the switch device may sustain currents as high as 400 mA with low voltage (e.g. 44 volts to 57 volts), so the power dissipation in the switch device is reasonably low. When a transient or power surge event occurs, an external protector may be activated to provide some protection, but the switch device may not turn off because the switch device may not detect the transient or power surge event. In such an instance, the switch device may experience both a high current (e.g. 400 mA) and a high voltage (e.g. 1000 volts), and the resulting power dissipation through the switch device may cause a failure. Hence, there is a need for an improved voltage protection circuit in power supply equipment.

SUMMARY

In a particular embodiment, a device to provide a power supply to one or more powered devices via a network is disclosed that includes an interface and an integrated circuit. The interface is communicatively coupled to a network connection to provide power and data to a power over Ethernet (PoE) powered device via the network connection. The integrated circuit is coupled to the interface. The integrated circuit includes a power over Ethernet (PoE) controller, a detection and classification circuit, and a voltage protection circuit. The detection and classification circuit is coupled to the interface to detect and classify the PoE powered device. The voltage protection circuit is coupled to the interface to detect a power event and to provide an alert to the PoE controller in response to the detected power event.

In another particular embodiment, an integrated circuit includes a power output, a switch, a power over Ethernet (PoE) controller, and a voltage protection circuit. The switch includes a first terminal coupled to the power output, a control terminal, and a second terminal coupled to a power supply terminal. The PoE controller is coupled to the control terminal. The PoE controller can selectively control the switch to provide power to the power output. The voltage protection circuit is coupled to the first terminal to detect a power event and to shunt excess voltage away from the switch in response to the detected power event.

In still another particular embodiment, a method of protecting circuitry of power sourcing equipment of a power over Ethernet network is disclosed. The method includes detecting a power event at a switched terminal of an integrated circuit using a power protection circuit, activating the power protection circuit to divert power resulting from the power event away from the switched terminal when the power exceeds a threshold, and providing an alert to a power over Ethernet (PoE) controller.

DETAILED DESCRIPTION OF THE DRAWINGS

In general, a system is disclosed to provide power and data to a powered device, such as a Power over Ethernet (PoE) powered device, via a network connection. In a particular embodiment, the system may include PoE control circuit to selectively activate a switch to provide power to an output terminal and a voltage protection circuit (or power protection circuit) coupled to the output terminal to detect a power event, such as an over-voltage fault, a power surge, a transient event, or other undesired power events. In response to a detected power event, the voltage protection circuit may notify a PoE control circuit to deactivate the switch and to shut down associated circuitry, may shunt excess voltage away from the switch, or any combination thereof.

Figure 1:
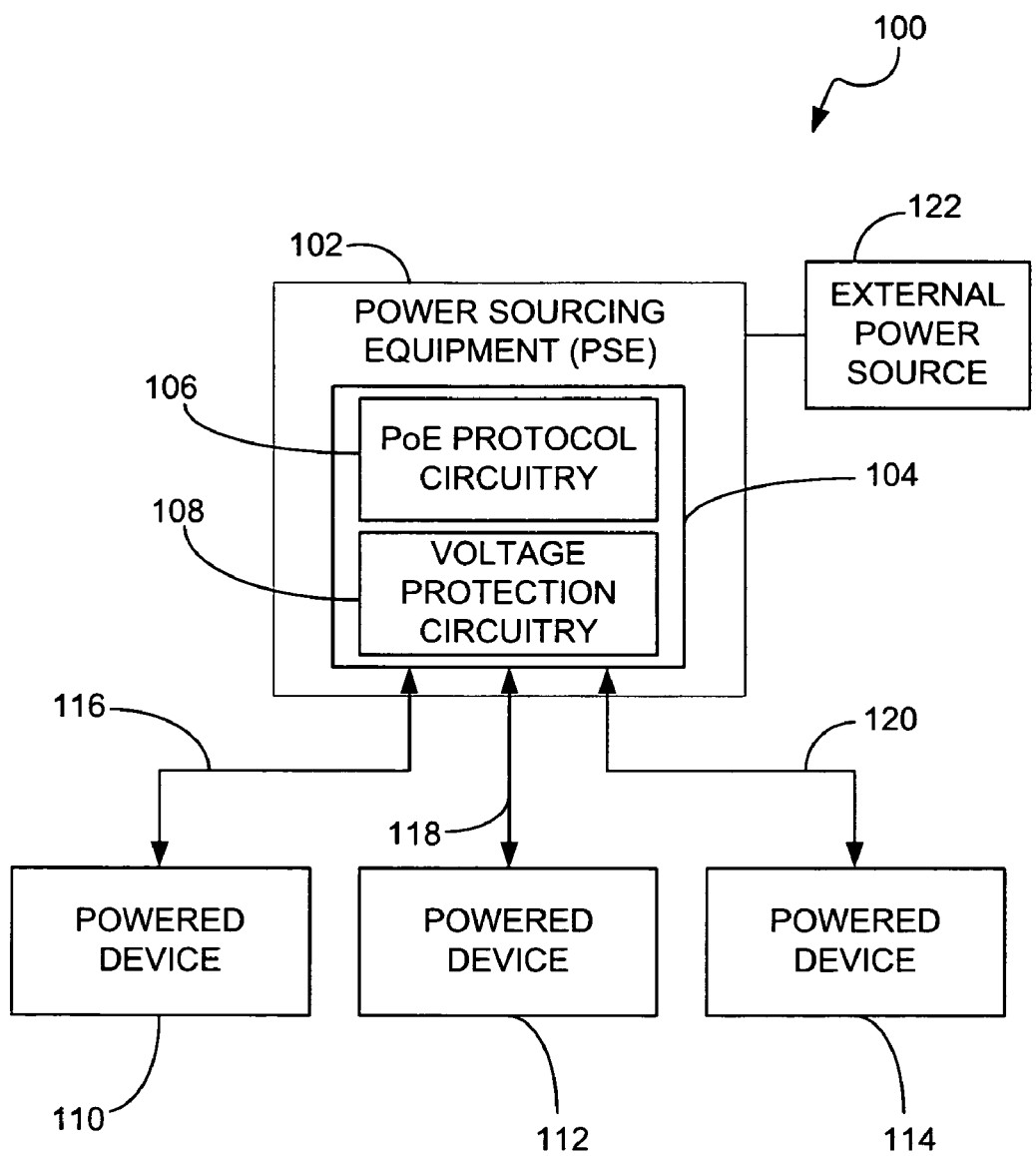
FIG. 1 is a block diagram of a particular illustrative embodiment of a power over Ethernet (PoE) system.

FIG. 1 is a block diagram of a particular illustrative embodiment of a power over Ethernet (PoE) system 100. The system 100 includes power sourcing equipment (PSE) device 102 that includes an integrated circuit 104. The integrated circuit 104 includes power over Ethernet (PoE) protocol circuitry 106 and power protection circuitry, such as voltage protection circuitry 108. The PSE device 102 may be coupled to one or more powered devices 110, 112, and 114 via network cables 116, 118 and 120, respectively. In a particular embodiment, the network cables 116, 118 and 120 may be Ethernet cables, such as Category 5 or Category 5e cables, which may be unshielded twisted-pair cables designed for high signal integrity. Such cables are often used in structured cabling for computer networks such as Gigabit Ethernet, although they are also used to carry many other signals such as basic voice services, token ring, and ATM (at up to 155 Mbit/s, over short distances). The PSE device 102 may be coupled to an external power source 122.

In a particular embodiment, the PSE device 102 may provide both power and data to the powered devices 110, 112, and 114. The PoE protocol circuitry 106 may determine whether a PoE powered device is coupled to the PSE device 102 via one of the network cables 116, 118 and 120. In a particular embodiment, the PoE protocol circuitry 106 may control a switching regulator to apply a detection voltage to each network cable and to monitor each network cable for a device signature that is indicative of a PoE powered device. In an illustrative embodiment, a powered device signature may include a current, a capacitance, an acknowledge signal, another indicator, or any combination thereof. In the PoE standard, a PoE powered device signature may include a current draw indicative of a resistance that is approximately 25.5 k-ohms. If, for example, the PoE powered device 110 is detected via the network cable 116 during such a detection process, the PoE protocol circuitry 106 may selectively apply power from the external power source 122 to the network cable 116 to provide power to the powered device 110. Similarly, the PoE protocol circuitry 106 may perform a powered device detection operation on the network cables 118 and 120. If an inappropriate response is detected on a particular network cable, the PoE protocol circuitry 106 does not apply power to the particular network cable.

Figure 2:
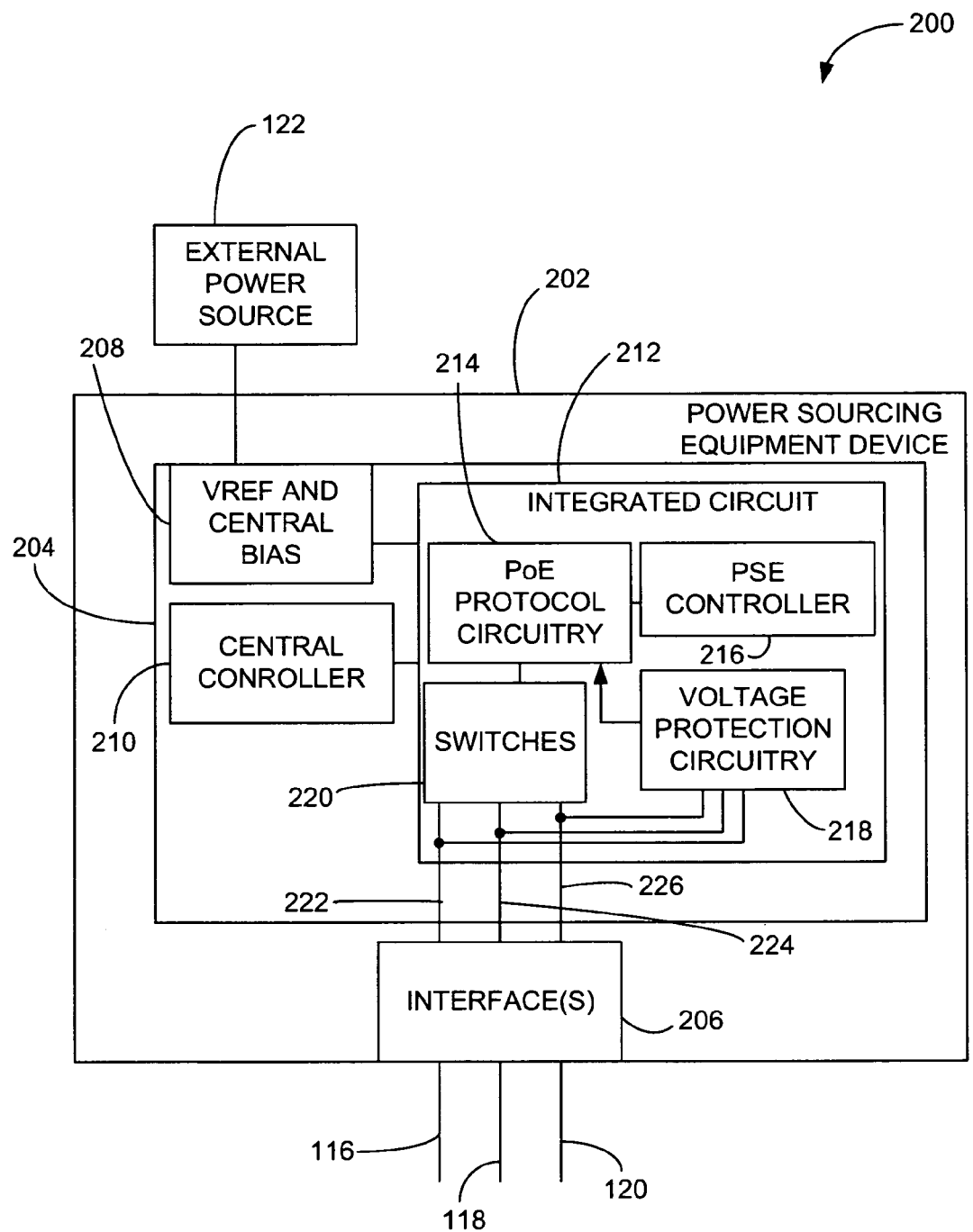
FIG. 2 is a block diagram of a particular illustrative embodiment of a power system including a power sourcing equipment (PSE) device for use in a PoE system, such as that shown in FIG. 1.

In a particular embodiment, the PSE device 102 may include network interfaces (such as the interface(s) 206 in FIG. 2) to receive the network cables 116, 118 and 120. The voltage protection circuitry 108 may monitor a power level of each of the network cables 116, 118, and 120 via the interfaces and may activate to clamp a power level of at the input port of the PSE device 102 at a predetermined voltage limit, when the power level exceeds a predetermined threshold. For example, the voltage protection circuitry 108 may activate when a voltage level of an input port of the PSE device 102 exceeds 64 volts and may clamp a voltage level of the associated input port at a level that is less than, for example, 94 volts. If the voltage is a negative voltage, the voltage protection circuitry 108 may limit the voltage level of the associated input port to a level that is greater than, for example, −94 volts.

In a particular embodiment, the PSE device 102 may operate as a midspan PoE device, which injects a power supply onto pairs of wires of the network cables 116, 118 and 120, between an Ethernet switch source (not shown) and the powered devices 110, 112, and 114. Alternatively, the PSE device 102 may operate as an Ethernet source device, which provides both Ethernet signals and power to the network cables 116, 118 and 120. The powered devices 110, 112 and 114 may utilize the power supplied from the respective network cables 116, 118 and 120, and utilize the data to perform various operations.

In general, a powered device, such as the powered devices 110, 112, 114 may include a field device (e.g. sensor, camera, transmitter, or any combination thereof) for monitoring an industrial process, voice over Internet protocol (VoIP) telephones, security devices (such as cameras, glass break sensors, contact sensors, and the like), and wireless access points. In general, powered devices, such as the powered devices 110, 112, and 114, may include any electronic device that derives power and receives data via the same cabling.

FIG. 2 is a block diagram of a particular illustrative embodiment of a power system 200 including a power sourcing equipment (PSE) device 202 for use in a PoE system, such as the system 100 shown in FIG. 1. The PSE device 200 may be coupled to an external power source 122 to receive a power supply. The PSE device 202 may include a circuit board 204 and one or more network interfaces 206, which may be responsive to one or more powered devices, such as the powered devices 110, 112, and 114 in FIG. 1, via network cables 116, 118 and 120. In a particular embodiment, the one or more network interfaces 206 may include a plurality of Ethernet connection interfaces, such as RJ-45 connectors, to receive a corresponding number of network cables, such as the network cables 116, 118 and 120.

The circuit board 204 may include a voltage reference (VREF) and central bias circuit 208, a central controller 210, and an integrated circuit 212, such as the integrated circuit 104 in FIG. 1. The integrated circuit 212 may include PoE protocol circuitry 214, a PSE controller 216, voltage protection circuitry 218, and one or more switches 220. The one or more switches 220 may selectively couple the integrated circuit 212 to the one or more interfaces 206 via lines 222, 224, and 226. The lines 222, 224, and 226 may be wire traces, wires, solder bumps, leads, an electrical connection, a logical connection, or any combination thereof.

In a particular illustrative embodiment, the external power supply 122 provides a power supply to the circuit board 204. The VREF and central bias circuit 208 derives a voltage reference and a bias current from the power supply and provides the voltage reference and bias current to the integrated circuit 212. The central controller 210 may be communicatively coupled to the integrated circuit 212 via a logical connection or a physical connection, such as a serial cable. In a particular embodiment, the central controller 210 may be implemented using a microcontroller unit (MCU), such as part number C8051F316, which is commercially available from Silicon Laboratories, Inc., of Austin, Tex. The central controller 210 may be adapted to configure the operation of the PSE controller 216 and the PoE protocol circuitry 214.

The PoE protocol circuitry 214 is adapted to perform powered device detection and classification, as specified by the PoE standard. Alternatively, the PoE protocol circuitry 214 may be controlled by the central controller 210 to perform other detection operations. Additionally, the PoE protocol circuitry 214 may control each of the one or more switches 220 to selectively apply power to the one or more lines 222, 224, and 226. The voltage protection circuitry 218 is adapted to monitor a power level (such as a voltage level, a current level, or both) at each of the one or more switches 220. When the voltage protection circuitry 218 detects a power level that exceeds a predetermined threshold (such as 64 volts) at a particular switch, the voltage protection circuitry 218 is activated to divert power away from the particular switch and to clamp a voltage level at the switch to a level that is less than a predetermined threshold (such as less than 94 volts). Additionally, the voltage protection circuitry 218 may generate a signal to the PoE protocol circuitry 214 to deactivate the particular switch of the one or more switches 220 to prevent a transient power surge from damaging the integrated circuit 212 or other components of the PSE device 202.

In general, the central controller 210 may provide commands to the integrated circuit 212 to force fixed voltages at particular ports (network connections) of the one or more interfaces 206. The central controller 210 may control an operating mode and current limit for each port or interface of the one or more interfaces 206. The central controller 210 may be utilized to set parameters for the PoE protocol circuitry and/or the PSE controller 216. Depending on the particular implementation, the PoE protocol circuitry 214 may perform predefined operations in response to control instructions received either from the central controller 210 or from the PSE controller 216. Additionally, the PSE controller 216 may be utilized to control the PoE protocol circuitry 214 to deactivate one or more particular switches of the one or more switches 220 when a power level exceeds a threshold (e.g., when the voltage protection circuitry 218 is activated).

Figure 3:
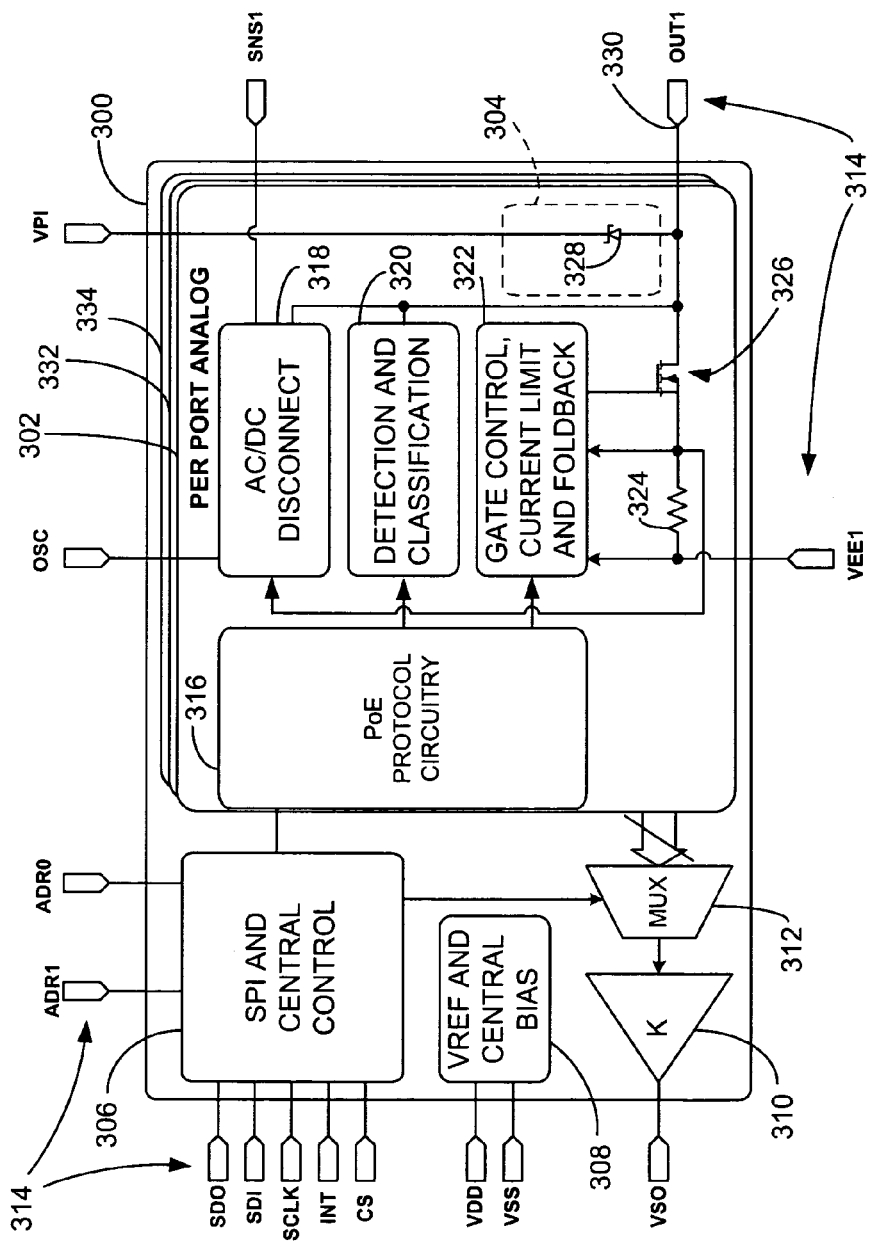
FIG. 3 is a block diagram of a particular illustrative embodiment of a circuit board including an integrated circuit with voltage protection circuitry for use in a device, such as the PSE device shown in FIG. 2.

FIG. 3 is a block diagram of a particular illustrative embodiment of a circuit board 300 including an integrated circuit 302 with voltage protection circuitry 304 for use in a device, such as the PSE device 202 shown in FIG. 2. The circuit board 300 includes a serial port interface (SPI) and central control circuit 306, a voltage reference (VREF) and central bias circuit 308, a gain circuit 310, a multiplexer 312, and a plurality of pins 314. The integrated circuit 302 may include PoE protocol circuitry 316, the voltage protection circuitry 304, an AC/DC disconnect circuit 318, a PoE powered device detection and classification circuit 320, a gate control, current limit and foldback circuit 322, a resistor 324, a switch device (such as a transistor 326), and an output pin 330. The voltage protection circuitry 304 may include a zener diode 328.

In general, the circuit board 300 may be coupled to a central control unit, such as the central controller 210 in FIG. 2, via address pins (ADR1 and ADR0) to receive address information and via an oscillator pin (OSC) to receive an oscillator signal. Additionally, the circuit board 300 may be coupled to the central control unit via a serial device output (SDO) pin, a serial device input (SDI) pin, a serial clock (SCLK) pin, an interrupt output (INT) pin, and a channel select (SC) pin. The VDD pin and the VSS pin may be responsive to an external device and to the VREF and central bias circuit 308 to receive or provide voltage reference signals. The integrated circuit 302 may receive power via power supply pins VEE1 and VPI. The integrated circuit 302 may also include an SNS1 pin and an output (OUT1) pin 330.

In a particular embodiment, the PoE protocol circuitry 316 of the integrated circuit 302 is adapted to control the detection and classification circuit 320 to detect and to classify a powered device when a powered device is coupled to the output pin 330. The PoE protocol circuitry 316 may control the gate control, current limit and foldback circuit 322 to limit power according to a determined classification of the powered device.

Table 1 below provides an illustrative example of a set of PoE classifications for power classification, including a classification current drawn to select a particular classification and a power level associated with each power classification.

TABLE 1

| Class | Classification Current (mA) | Power level low (watts) | Power Level high (watts) |
|---|---|---|---|
| 0 | 2 to 4 | 27.95 | 55.95 |
| 1 | 9 to 12 | 3.84 | 6.49 |
| 2 | 17 to 20 | 6.49 | 12.95 |
| 3 | 26 to 30 | 12.95 | 27.95 |
| 4 | 36 to 44 | reserved | reserved |

When the detection and classification circuit 320 detects a classification current within a range of 9 to 12 mA, the PoE protocol circuitry 316 may control the gate control, current limit and foldback circuit 322 to limit a power level to the output pin 330 to a power range of 3.84 watts to 6.49 watts, for example. The gate control, current limit and foldback circuit 322 may receive instructions from the PoE protocol circuitry 316 or from the AC/DC disconnect circuit 318 to set power limits for the output pin 330. The gate control, current limit and foldback circuit 322 monitors current flow across the resistor 324 and controls the switch 326 to limit current and voltage applied to the output pin 330.

In a particular embodiment, the power protection circuit 304 may include a zener diode 328 to detect a negative voltage at the output pin that is greater than a breakdown voltage of the zener diode 328. The zener diode 328 includes an anode terminal coupled to the output pin 330 and a cathode terminal coupled to the VPI pin, which may be coupled to a voltage terminal, such as an electrical ground terminal. In such an arrangement, the zener diode 328 is referenced to an electrical ground, such that if the negative voltage at the output pin 330 falls below a threshold (e.g. −62 volts), the zener diode 328 is activated to pull up the voltage level at the output pin 330. In this particular embodiment, the AC/DC disconnect circuit 318 may detect the voltage level of the output pin 330 and may notify the gate control, current limit and foldback circuit 322 to deactivate the switch 326. In general, by integrating the power protection circuit 304, the integrated circuit 302 may divert excess power, clamp a voltage level at the output pin 30, and shut off the switch device 326 to protect associated circuitry.

In a particular embodiment, the circuit board 300 may include a plurality of integrated circuits 302, 332 and 334, such that each integrated circuit 302, 332 and 334 controls a power supply to a particular output pin, such as the output pin 330. Additionally, each integrated circuit 302, 332 and 334 may operate independently of the other integrated circuits. The SPI and central control circuit 306 may provide power budget information to each of the integrated circuits 302, 332 and 334. The multiplexer 312 may receive information from one or more of the integrated circuits 302, 332, and 334, and the SPI and central control circuit 306 may select which input is provided to the gain control circuit 310. In a particular implementation, the circuit board 300 may be included within a PSE device, such as the PSE device 202 of FIG. 2. The PSE device 202 may be adapted to provide power and data to a plurality of powered devices, and each integrated circuit 302, 332 and 334 may be associated with a single network port.

Figure 4:
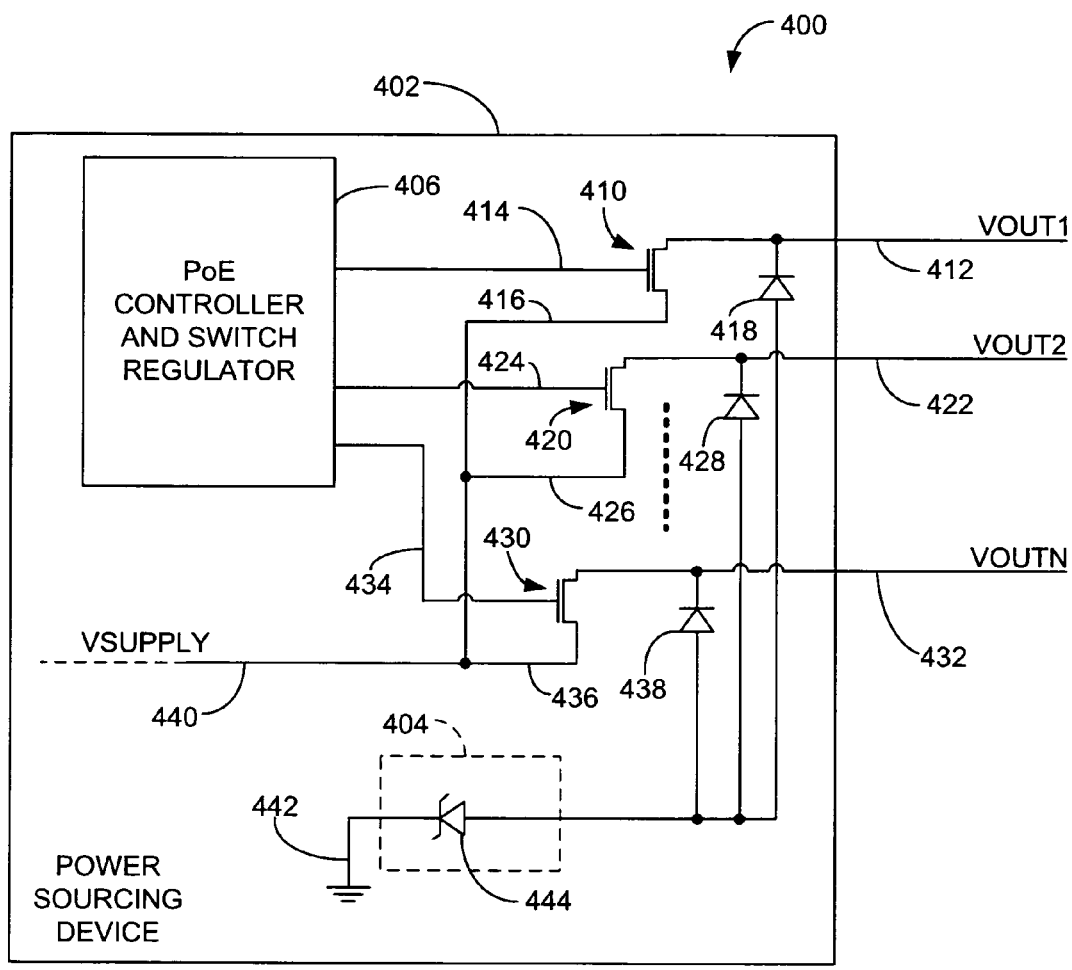
FIG. 4 is a general diagram of a particular illustrative embodiment of an integrated circuit including a shared voltage protection circuit for use in a device, such as the PSE device shown in FIG. 2.

FIG. 4 is a general diagram of a particular illustrative embodiment of a portion 400 of an integrated circuit 402 including a shared voltage protection circuit 404 for use in a device, such as the PSE device 202 shown in FIG. 2. The integrated circuit 402 includes PoE controller and switch regulator circuitry 406, switch devices 410, 420, and 430, diodes 418, 428, and 438, and voltage supply terminals 440 and 442.

In general, the first switch device 410 includes a first output terminal (Vout1) 412, a first control terminal 414 coupled to the PoE controller and switch regulator 406, and a first power terminal 416 coupled to the voltage supply (VSupply) terminal 440. The second switch device 420 includes a second output terminal 422 (Vout2), a second control terminal 424 coupled to the PoE controller and switch regulator 406, and a second power terminal 426 coupled to the voltage supply terminal 440. The third switch device 430 includes a third output terminal 432 (VoutN), a third control terminal 434 coupled to the PoE controller and switch regulator 406, and a third terminal 436 coupled to the voltage supply terminal 440. Each of the switch devices 410, 420 and 430 can be controlled independently by the PoE controller and switch regulator 406 to selectively provide power to the output terminals 412, 422 and 432. The output terminals 412, 422, and 432 may be coupled to respective powered devices via network cables.

In a particular embodiment, the zener diode 444 has a characteristic breakdown voltage of approximately 63 volts. In a first mode of operation (such as when a voltage supply at the first output terminal 412 is within a normal operating range, such as between −44 and −57 volts), the diode 418 is inactive. In a second mode of operation, when the voltage supply at the first output terminal 412 falls below −57 volts (e.g. −64 volts or less), the voltage potential across the voltage protection circuit 404 exceeds a breakdown voltage of a zener diode 444 and begins to conduct, forward biasing the diode 418 and pulling up the voltage level at the first output terminal 412. In this embodiment, the voltage protection circuit 404 may be shared between a plurality of outputs, such as the output terminals 412, 422, and 432. The diodes 418, 428 and 438 may be high voltage diodes. A majority of the power is dissipated in the voltage protection circuit 404, so the power dissipated by the diodes 418, 428 and 438 may not present a problem. Additionally, the voltage protection circuit 404 makes it possible to put a number of protectors in parallel, by linking the shared voltage protection circuit 404 to each output by a diode, such as the diodes 418, 428, and 438. In general, most transients occur when cables are plugged in or unplugged from the PSE device and from the integrated circuit 402, so the probability of all of the channels (e.g. output terminals 412, 422, and 432) experiencing a transient power surge at the same time is small. When the voltage protection circuit 404 is shared, a large protection device may be utilized that can provide robust transient protection under a variety of transient scenarios, even if all of the channels experience transient power events at the same time. Moreover, the voltage protection circuit 404 may be more efficient in terms of circuit area, may reduce design complexity, and may reduce overall costs of the integrated circuit 402.

Figure 5:
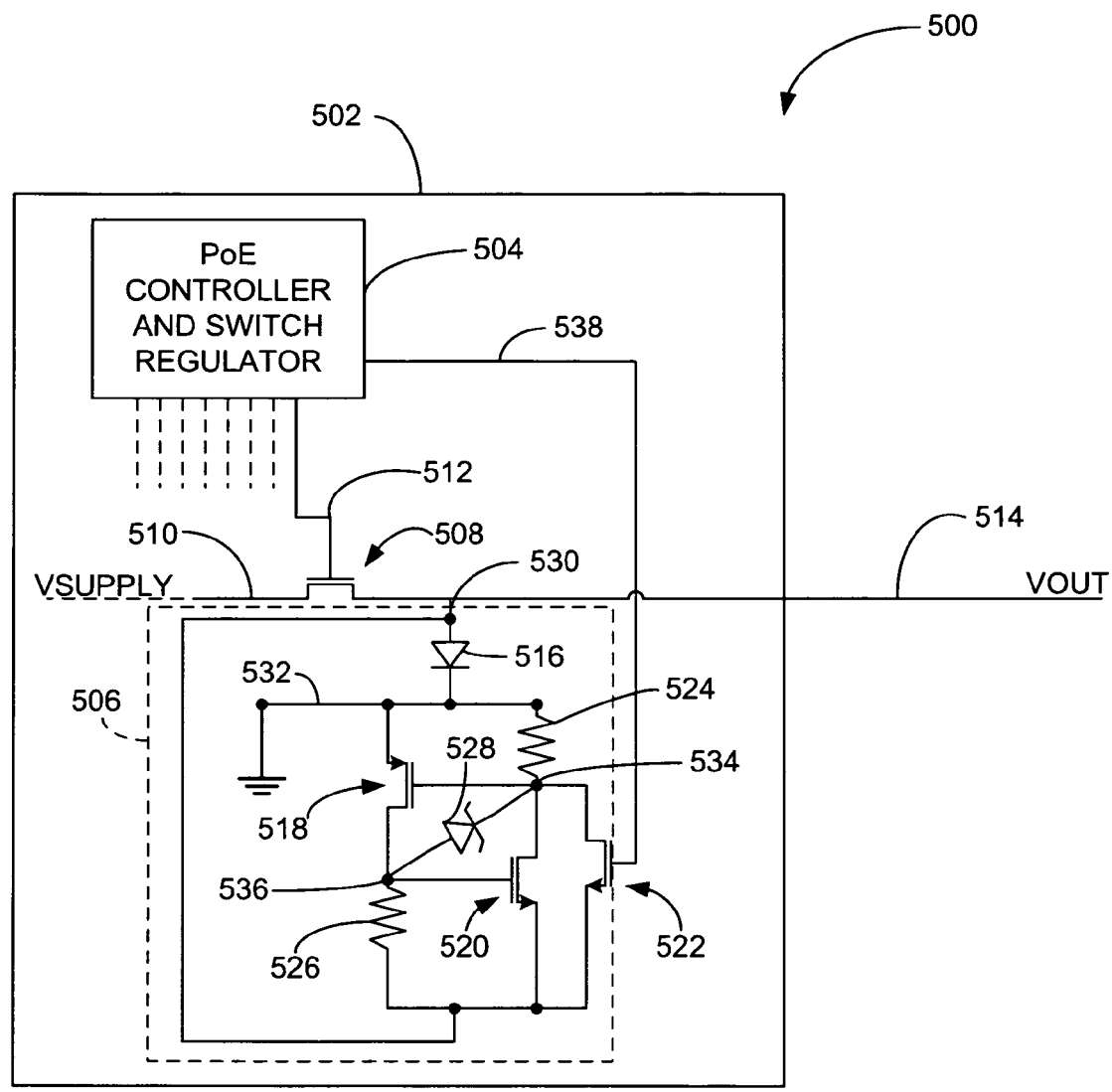
FIG. 5 is a general diagram of a second particular illustrative embodiment of an integrated circuit including a voltage protection circuit for use in a device, such as the PSE device shown in FIG. 2.

FIG. 5 is a general diagram of a particular illustrative embodiment of a portion 500 of an integrated circuit 502 including a voltage protection circuit 506 for use in a device, such as the PSE device 202 shown in FIG. 2. The integrated circuit 502 includes a PoE controller and switch regulator 504, the voltage protection circuit 506, and a switch device 508. The switch device 508 includes a first terminal 510 coupled to the voltage supply (VSupply) terminal, a control terminal 512 coupled to the PoE controller and switch regulator 504, and a second terminal coupled to the voltage output terminal (Vout) 514. The voltage protection circuit 506 includes a diode 516 having an anode terminal coupled to a node 530 that is coupled to the voltage output terminal (Vout) 514 and having a cathode terminal that is coupled to a voltage supply terminal 532, which may be at an electrical ground. The voltage protection circuit 506 also includes transistors 518, 520, and 522, resistors 524 and 526, and a zener diode 528. In a particular embodiment, the voltage protection circuit 506 may be a voltage-triggered silicon controlled regulator (SCR).

The transistor 518 includes a first terminal coupled to the voltage supply terminal 532, a control terminal coupled to a node 534, and a second terminal coupled to a node 536. The resistor 524 is coupled between the voltage supply terminal 532 and the node 534. The transistor 520 includes a first terminal coupled to the node 534, a control terminal coupled to the node 536, and a second terminal coupled to the node 530. The resistor 526 is coupled between the node 536 and the node 530. The transistor 522 includes a first terminal coupled to the node 534, a control terminal coupled to the PoE controller and switch regulator 504 by a line 538, and a second terminal coupled to the node 530.

It should be understood that the voltage protection circuit 506 defines three modes of operation: an inactive mode, an active positive voltage shunt mode, and an active negative voltage shunt mode. During normal operations, the voltage protection circuit 506 may be inactive, since the voltage level on the voltage output terminal (Vout) 514 may be around −57 volts, which is less than the turn on voltage of the zener diode 528 and which negative biases the diode 516. When the voltage level on the voltage output terminal (Vout) 514 exceeds +1 volt, the diode 516 turns on and provides a current path to ground via the voltage supply terminal 532. When the voltage level falls below −63 volts, the zener diode 528 (such as a zener diode having a characteristic breakdown voltage of approximately 62 volts) may breakdown, drawing current across the resistor 524, and applying a turn on voltage to both the transistor 518 and the transistor 520 to shunt power from the voltage output terminal (Vout) 514 to the voltage supply terminal 532, which is at electrical ground.

In general, the diode circuit 528 defines a voltage threshold for the voltage protection circuit 506. When a voltage differential between the voltage supply terminals 514 and 532 exceeds the characteristic breakdown voltage of the diode circuit 528, the diode circuit 528 begins conducting. A voltage at node 536 (at the gate terminal of the transistor 520) increases and activates the transistor 520, which pulls down the voltage at the node 534 (gate terminal of the transistor 518), activating the transistor 518, thereby shunting the current between the voltage output terminal (Vout) 514 and the supply terminal 532. In general, the transistors 518 and 520 turn on asynchronously, resulting in an abrupt change in the voltage differential between the voltage output and supply terminals 514 and 532 at the point where both transistors 518 and 520 become active.

In general, in a first mode of operation, the voltage protection circuit 506 presents a high impedance to the voltage output and supply terminals 514 and 532. In a second mode of operation, the voltage protection circuit 506 has a first over-voltage characteristic. An example of the first over-voltage characteristic is represented by line 604 in FIG. 6. In a third mode of operation, the voltage protection circuit 506 has a second over-voltage protection characteristic. An example of the second over-voltage characteristic is represented by line 606 in FIG. 6. In a particular embodiment, the voltage output and supply terminals 514 and 532 provide an input voltage that is at a higher voltage in the second mode of operation than in the first or the third modes of operation. For example, in the first mode of operation, the differential supply voltage between the voltage output and supply terminals 514 and 532 may range from zero volts to approximately 55 volts. In a second mode of operation, the differential supply voltage may be greater than 55 volts with a current of up to approximately 1 A. In a third mode of operation, the supply voltage has a voltage level of less than approximately 10 volts and a current level greater than approximately 0.5 A. In the second and third modes of operation, the voltage protection circuit 506 becomes active, providing a lower impedance between the voltage output and supply terminals 514 and 532 than during the first mode of operation.

It should be understood that the voltage and current levels described herein are illustrative only. Other voltage and current levels may also be achieved by adjusting the breakdown voltage of the diode circuit, for example. A lower breakdown voltage provides for second and third modes of operation at a lower voltage level. For example, if the breakdown voltage of the diode circuit is at approximately 30 volts, then the second mode of operation would be greater than approximately 30 volts. Similarly, a higher breakdown voltage provides for a higher voltage level at the second and third modes of operation.

When the transient voltage or power surge event ends, the voltage protection circuit 506 may turn off automatically or may be turned off by the PoE controller and switch regulator 504. During this recovery phase, when the supply voltage on the voltage output and supply terminals 514 and 532 falls below the voltage threshold of the diode circuit 528, the diode circuit 528 turns off, causing the voltage to decrease at the gate terminal of transistor 520 and to increase rapidly at the gate terminal of the transistor 518. The transistor 518 turns off in response to the increased voltage at its gate terminal (at node 534), and the voltage level at the gate terminal (node 536) of the transistor 520 decreases rapidly, turning off the transistor 520.

In a particular embodiment, the PoE controller and switch regulator 504 may control the transistor 522 to selectively activate and deactivate the voltage protection circuit 506.

It should be understood that, though the diode circuit 528 is illustrated as a single high voltage zener diode with a breakdown voltage (such as approximately 62 volts), the diode circuit 528 can be formed from a plurality of diodes in series, where each of the plurality of diodes has a small breakdown voltage. Additionally, it should be understood that, though the transistors 518 and 520 are shown as bipolar junction transistors, other types of transistors may also be used, such as insulated gate field effect transistors, metal oxide semiconductor field effect transistors, or other suitable electronic switches. In one embodiment, the diode circuit 528 may be a trigger element, and the transistors 518 and 520 may operate as a switch responsive to the trigger element. The voltage protection circuit 506 reduces the transient voltage seen by the PSE device and associated circuitry. The power dissipated in the transistors 518 and 520 is much lower than is dissipated in a large external zener diode, so the reliability and robustness of the voltage protection is improved.

In a particular embodiment, the diode circuit 528 defines a turn-on threshold for the transistors 518 and 520, and that the resulting voltage at the gate terminals of the transistors 518 and 520 can be considered control signals. Alternatively, the transistors 518 and 520 could be activated by a control signal sent, for example, by a controller or other active circuit element upon detection of a voltage fault condition. In a particular embodiment, the PoE controller and switch regulator 504 may selectively activate the switch device 522 via the line 538 to pull down a voltage at the node 534 to activate the voltage protection circuit 506.

Figure 6:
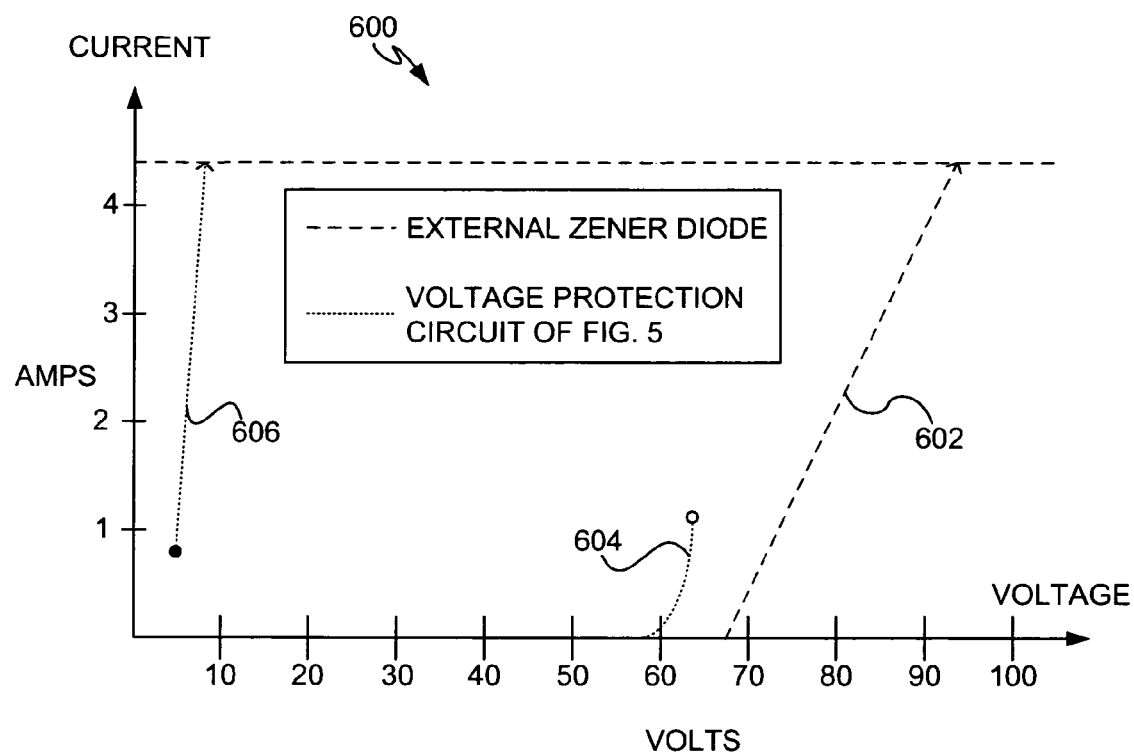
FIG. 6 is a graph illustrating voltage versus current comparing a traditional zener diode protection device to the voltage protection circuit of FIG. 5.

FIG. 6 is a graph 600 illustrating voltage versus current, comparing a traditional external zener diode protection device to the circuit of FIG. 5. For purposes of comparison, it may be understood that a conventional, large external zener diode may turn on at approximately 67 volts and may clamp the input supply voltage to approximately less than 64 volts for a 4.3 A transient current, as indicated by dashed line 602.

In contrast, the voltage protection circuit 506 of FIG. 5 can turn on at approximately 58 volts. After the voltage protection circuit 506 is activated, the voltage may increase to a little over 60 volts for a current up to approximately 1 A, as illustrated by line 604. If the voltage continues to increase, the current may increase and the transistor 518 may turns on, clamping the voltage at a value of less than 10 volts for a 4.3 A transient current as illustrated by line 606.

Figure 7:
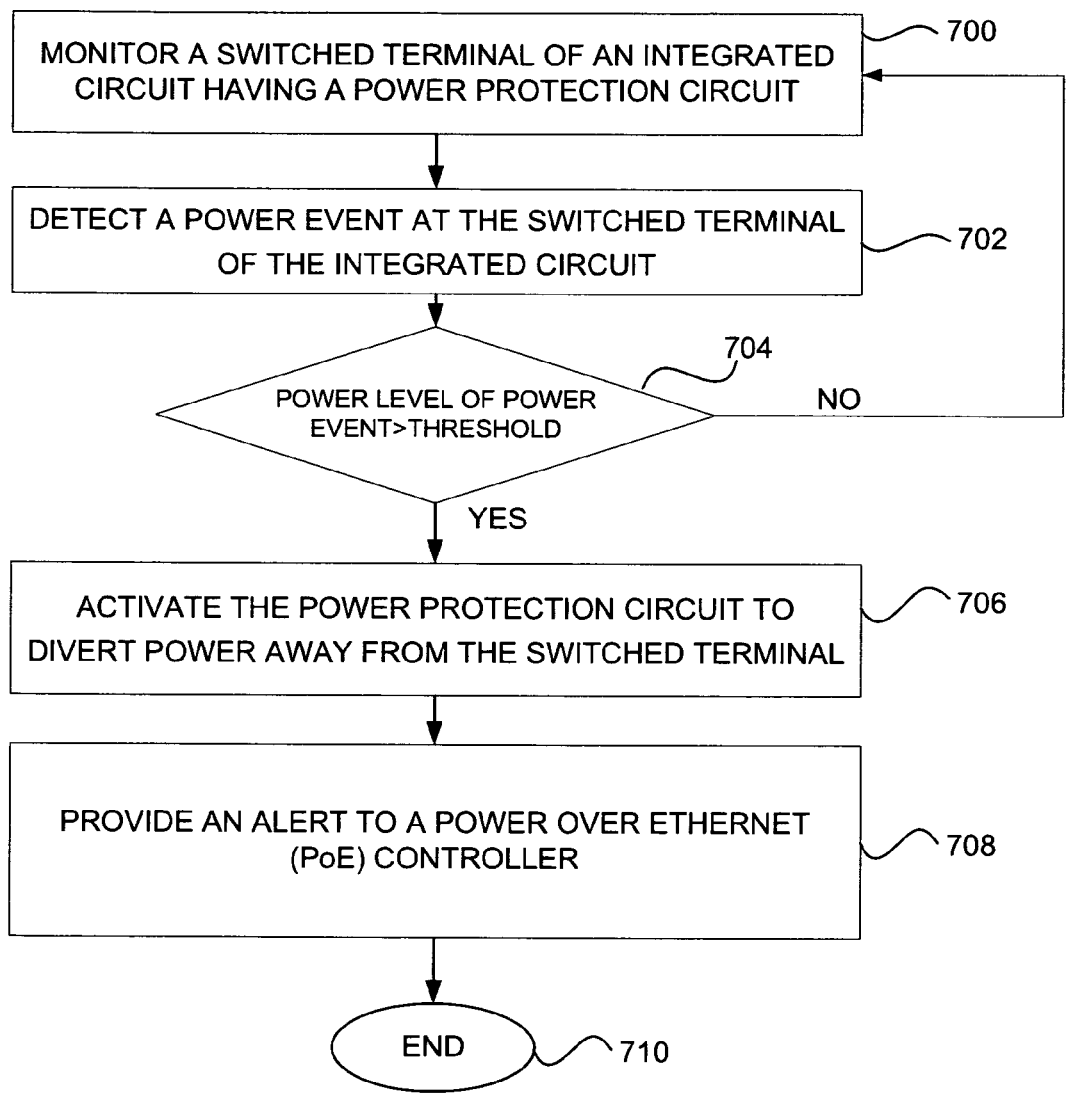
FIG. 7 is a flow diagram of a particular illustrative embodiment of a method of protecting circuitry of a PSE device of a power over Ethernet network.

FIG. 7 is a flow diagram of a particular illustrative embodiment of a method of protecting circuitry of a PSE device of a power over Ethernet network. A switched terminal of an integrated circuit having a power protection circuit is monitored (block 700). The terminal may be monitored by the power protection circuit (such as the voltage protection circuit 506 in FIG. 5), by a PoE controller and switch regulator (such as the PoE controller and switch regulator 504 in FIG. 5), by a PoE protocol circuit (such as the PoE protocol circuitry 214 in FIG. 2), by AC/DC disconnect circuitry (such as the AC/DC disconnect circuit 318 in FIG. 3), or by any combination thereof. The method advances to block 702. A power event is detected at the switched terminal of the integrated circuit (block 702). The method advances to block 704. If the power level of the power event is not greater than a threshold, the method returns to block 700. If the power level is greater than the threshold, the method advances to block 706. The power protection circuit is activated to divert power away from the switched terminal (block 706). The method advances to block 708. An alert is provided to a power over Ethernet (PoE) controller (block 708). The PoE controller may deactivate a switch to turn off power to the terminal and to prevent the power event from damaging associated circuitry. The method is terminated at block 710.

In general, though the embodiments described above have focused largely on PoE implementations, it should be understood that the over-voltage protection circuit or element may be utilized in other applications where power fault protection is desired. The above-described embodiments may be employed with other types of powered networks, where the power supply voltage cabling also carries data. In another embodiment, the wiring may include a power bus that carries both power and data. In another embodiment, the wiring may include a coaxial cable that carries both power and data.

Additionally, in the above-discussion, the over-voltage protection element has been described with respect to voltage potentials. However, it should be understood that the protection element may also be referred to as a power protection element, because power is a function of voltage and current. When activated, the power protection element limits the voltage and shunts current between the input supply terminals to protect load circuitry from transient high voltage and high current events.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device to provide power to one or more powered devices via a network, the device comprising:
   an interface adapted to be communicatively coupled to a network connection to provide power and data to a power over Ethernet (PoE) powered device via the network connection; and
   an integrated circuit coupled to the interface, the integrated circuit comprising:
      a power over Ethernet (PoE) controller;
      a detection and classification module coupled to the interface to detect and classify a power level of the PoE powered device; and
      a voltage protection circuit coupled to the interface to detect a power event comprising a power level that exceeds a threshold power level, the voltage protection circuit to limit power supplied to the interface and provide an alert to the PoE controller in response to the detected power event, wherein the PoE controller is configured to deactivate a switch turning off power to the interface and to shut down associated circuitry on the integrated circuit in response to the alert.

2. The device of claim 1, wherein the power event comprises a transient power surge.

3. The device of claim 1, wherein the PoE controller automatically deactivates the voltage protection device after the power event is ended.

4. The device of claim 1, further comprising a power supply circuit to generate a regulated power supply, wherein the PoE controller is adapted to deactivate the power supply circuit during the power event.

5. The device of claim 1, wherein the voltage protection circuit comprises:
   an over-voltage threshold component to detect an over-voltage condition; and
   a switch coupled to the over-voltage threshold component to clamp a voltage level associated with the power event to a level that is below a threshold voltage level.

6. The device of claim 1, wherein the voltage protection circuit comprises two switches adapted to activate asynchronously in response to the detected power event to limit the power event to a reduced voltage level.

7. An integrated circuit comprising:
   a power output;
   a switch including an output terminal coupled to the power output, a control terminal, and a power terminal coupled to a power supply terminal;
   a power over Ethernet (PoE) controller coupled to the control terminal, the PoE controller to selectively control the switch to provide power to the output terminal, the PoE controller configured to deactivate the switch turning off power to the power output and to shut down associated circuitry on the integrated circuit in response to receiving an alert; and
   a voltage protection circuit coupled to the output terminal, the voltage protection circuit to detect a power event and to shunt excess current away from the switch in response to the detected power event, the voltage protection circuit to provide the alert to the PoE controller in response to the power event.

8. The integrated circuit of claim 7, wherein the power event comprises a power surge that exceeds a predetermined threshold.

9. The integrated circuit of claim 7, wherein the voltage protection circuit is responsive to the PoE controller to deactivate after the power event is ended.

10. The integrated circuit of claim 7, wherein the voltage protection circuit is coupled to at least one output terminal of each switch of a plurality of switches, and wherein the voltage protection circuit is adapted to detect a power event at one of the plurality of switches.

11. The integrated circuit of claim 7, wherein the voltage protection circuit comprises a silicon controlled rectifier circuit.

12. The integrated circuit of claim 7, wherein:
   in a first mode of operation, the voltage protection circuit presents a high impedance to the output terminal;
   in a second mode of operation, the voltage protection circuit has a first power protection characteristic; and
   in a third mode of operation, the voltage protection circuit has a second power protection characteristic, the voltage protection circuit to shunt power away from the switch in the third mode of operation.

13. The integrated circuit of claim 12, wherein the voltage protection circuit is at a higher voltage in the second mode of operation than in the third mode of operation.

14. The integrated circuit of claim 13, wherein the higher voltage is greater than 55 volts and wherein the voltage protection circuit has a current level less than one Ampere.

15. The integrated circuit of claim 12, wherein in the third mode of operation, the voltage protection circuit has a voltage level less than ten volts and a current level greater than half an Ampere.

16. The integrated circuit of claim 12, wherein the voltage protection circuit changes from the second mode of operation to the first mode of operation after a current level of the voltage protection circuit falls below a threshold current level.

17. The integrated circuit of claim 7, wherein the voltage protection circuit comprises:
   a diode including an anode terminal coupled to the output terminal and a cathode terminal;
   a first transistor including a first terminal coupled to the cathode terminal, a second control terminal coupled to a first node, and a third terminal coupled to a second node;
   a first resistor coupled between the cathode terminal and the first node;
   a second transistor including a fourth terminal coupled to the first node, a fifth control terminal coupled to the second node, and a sixth terminal coupled to a voltage supply terminal;
   a second resistor coupled between the second node and the voltage supply terminal; and
   a zener diode coupled between the first node and the second node, the zener diode to define a threshold voltage of the power event.

18. The integrated circuit of claim 17, further comprising a third transistor comprising a seventh terminal coupled to the first node, an eighth control terminal responsive to the PoE controller, and a ninth terminal coupled to the voltage supply terminal, the third transistor responsive to the PoE controller to selectively activate and deactivate the voltage protection circuit.

19. The integrated circuit of claim 17, wherein the first transistor and the second transistor are activated asynchronously in response to detection of a power event.

20. A method of protecting power sourcing equipment providing power over an Ethernet network, the method comprising:
   detecting a power event at a switched terminal of an integrated circuit having a power protection circuit, the power event comprising a power level that exceeds a threshold power level;

activating the power protection circuit to divert power resulting from the power event away from the switched terminal when the power level exceeds the threshold power level;

providing an alert to a power over Ethernet (PoE) controller of the integrated circuit in response to detecting the power event;

deactivating the switched terminal using the PoE controller in response to receiving the alert; and shutting down associated circuitry on the integrated circuit using the PoE controller in response to receiving the alert.

21. The method of claim 20, wherein the power protection circuit is shared by a plurality of switched terminals.

22. The method of claim 20, wherein the power protection circuit includes a first transistor and a second transistor, and wherein activating the power protection circuit comprises asynchronously activating the first transistor and the second transistor.

23. The method of claim 20, wherein detecting a power event comprises:

detecting a voltage at a silicon controlled rectifier of an integrated circuit, the integrated circuit having at least one low-voltage component; and maintaining a first transistor and a second transistor in an off state when the voltage is less than a voltage protection threshold.

24. The method of claim 23, wherein activating the power protection circuit comprises:

activating the first transistor and the second transistor to clamp the voltage to a lower voltage level when the voltage exceeds the voltage protection threshold; and generating a fault protection signal to the PoE controller to shut off power to the at least one low-voltage component.

* * * * *